United States Patent
Koch

(10) Patent No.: US 6,632,053 B2
(45) Date of Patent: Oct. 14, 2003

(54) METHOD OF DIRECTING THE MOVEMENT OF A TOOL AS PART OF A PROCESS TO REMOVE MATERIAL FROM A BLOCK OF MATERIAL

(75) Inventor: Josef Koch, Munich (DE)

(73) Assignee: Open Mind Software Technologies GmbH (DE)

(*) Notice: Subject to any disclaimer, the term of this patent is extended or adjusted under 35 U.S.C. 154(b) by 37 days.

(21) Appl. No.: 09/829,921

(22) Filed: Apr. 11, 2001

(65) Prior Publication Data

US 2001/0048857 A1 Dec. 6, 2001

Related U.S. Application Data

(60) Provisional application No. 60/196,105, filed on Apr. 11, 2000.

(51) Int. Cl.$^7$ .............................. B23C 1/00; G05B 19/19
(52) U.S. Cl. .................. 409/132; 409/84; 700/178; 700/173; 700/187; 700/188; 700/189; 700/193
(58) Field of Search ................................. 409/131–132, 409/79–80, 84; 700/178, 177, 173, 176, 187, 188, 191, 193, 186, 189

(56) References Cited

U.S. PATENT DOCUMENTS

| | | | | |
|---|---|---|---|---|
| 3,774,279 A | * | 11/1973 | Hunter ................... | 144/154.5 |
| 4,503,373 A | * | 3/1985 | Nozawa et al. ............. | 700/193 |
| 4,513,366 A | * | 4/1985 | Munekata et al. .......... | 700/178 |
| 4,559,601 A | * | 12/1985 | Kishi et al. ................. | 700/187 |
| 4,674,928 A | * | 6/1987 | Lyman ........................ | 409/80 |
| 5,043,906 A | * | 8/1991 | Jepson ....................... | 700/182 |
| 5,107,436 A | * | 4/1992 | Levine et al. ............... | 700/186 |
| 5,140,236 A | * | 8/1992 | Kawamura et al. ......... | 700/187 |
| 5,305,228 A | * | 4/1994 | Seki et al. .................. | 700/187 |
| 5,369,592 A | * | 11/1994 | Honda ........................ | 700/187 |
| 5,378,091 A | * | 1/1995 | Nakamura .................. | 409/132 |
| 5,508,596 A | * | 4/1996 | Olsen ......................... | 700/174 |
| 5,595,391 A | * | 1/1997 | Rivin ......................... | 409/234 |
| 5,751,584 A | * | 5/1998 | Yuasa et al. ................ | 700/178 |
| 6,311,100 B1 | * | 10/2001 | Sarma et al. ............... | 700/186 |

FOREIGN PATENT DOCUMENTS

| DE | 19846426 A1 | * | 4/2000 |
|---|---|---|---|
| EP | 1146408 A1 | * | 10/2001 |

* cited by examiner

Primary Examiner—A. L. Wellington
Assistant Examiner—Erica E Cadugan
(74) Attorney, Agent, or Firm—Pepper Hamilton LLP

(57) ABSTRACT

A method of guiding a tool for machining a work piece of a material block, the material-removing work portion of the tool being guided to move along a first guide path while a further point on the axis of the tool, which is located at a distance from the work portion, is guided along a prescribed second guide path, whereby the five kinematic coordinates of the movement of the tool are fully determined.

14 Claims, 10 Drawing Sheets

METHOD OF DIRECTING THE MOVEMENT OF A TOOL AS PART OF A PROCESS TO REMOVE MATERIAL FROM A BLOCK OF MATERIAL

PRIORITY

The present invention claims priority under 35 U.S.C. §119 from the provisional application entitled Procedure for Directing the Movement of a Tool as Part of a Process to Remove Material from a Block of Material, filed Apr. 11, 2000, and assigned U.S. Provisional Patent Application Ser. No. 60/196,105, the entire application which is herein incorporated by reference.

FIELD OF THE INVENTION

The present invention relates generally to a method of controlling the movement of a tool in the process of machining a block of material to produce a work piece of a prescribed shape, where a working portion of the tool that serves to shape the block by removing material from its surface, moves along a guide path extending in an essentially planar guide surface, so that an axis of the tool intersecting the guide path maintains a given orientation in relation to the guide surface.

BACKGROUND OF THE INVENTION

There are known various methods used, in particular, of producing complex-shaped work pieces in the fabrication of tools and dies. The material block from which the work piece of the prescribed shape is to be formed, is machined by a cutter head of a three- to five-axis milling machine. An optimization of this work process contributes significantly to a cost-effective production of sheet-metal and plastic parts of the kind used, for example, in the automobile industry and aircraft industry, as well as in the consumer goods industry.

However, the disadvantage of the conventional methods is that the work pieces that tool and die makers are required to produce are of increasingly curved and complex shapes that are difficult to achieve by conventional milling techniques. In particular, the milling of cavities, i.e., deeply recessed, hollowed-out spaces in the work piece, require a 3+2-axis milling process where the conventional practice is to set the cutting head at an acute angle-to the rotary axis of the actual milling tool, at least along sections of the guide path. However, this creates the difficulty that the cutter head could collide with the shape of the work piece that is in the process of being formed—a risk which is a significant drawback with these conventional methods, and against which these conventional methods do not offer sufficient protection.

Further, another disadvantage to the conventional methods, is that cavities can be produced only to a very limited extent.

SUMMARY OF THE INVENTION

It is therefore a feature and advantage of the present invention to provide a method of controlling the movement of a tool in the process of machining a block of material to produce a work piece of a prescribed shape, which allows work pieces of highly complex shapes to be produced with a high degree of process reliability.

In accordance with a first embodiment of the present invention, a method is disclosed which includes guiding a point on the tool axis located at a distance from a first guide path along a prescribed second guide path. The present invention is particularly well-suited for generating programs for five-axis milling machines. However, the method of the present invention is not limited to this particular application, but is also suitable for controlling the movement of other material-removing tools such as laser tools, for example.

In the first embodiment of the present invention, while the first guide path is selected so that the material-removing working portion of the tool (i.e., the cutting tip of a mill cutter), in moving along the first guide path which corresponds to a contour curve of the desired work piece shape in the guide surface, the second guide path is suitably selected so that the orientation of the rotary axis of the tool (i.e., the mill cutter), is at any time in the process optimally adapted to the surface wall of the work piece as it is being shaped, and/or the tool and its tool holder are held at a predetermined distance from the surface of the work piece.

As the shapes of the work pieces are customarily modeled in computer-aided design (CAD) systems, the CAD data can be provided through integrated or standardized interfaces as a basis for the computation of guide paths. The guide paths computed from the CAD data are delivered in data formats that are compatible with computer numerical controls (CNC's). The CNC's will then guide the numerically controlled machine tool so that two predetermined points on the tool axis, follow the first and second guide paths, respectively.

Therefore, the machine tool can be a five-axis milling machine which allows translatory movement of the milling tool along three mutually orthogonal translatory axes, as well as swivel movements about two mutually orthogonal rotary axes.

The computed guide paths need not be exactly planar curves (i.e., the guide surfaces containing the guide paths do not have to be perfectly planar). Further, it can be seen that in the course of machining a material block, the tool moves along a multitude of guide paths that run in guide surfaces which are, for example, mutually parallel, and also, for example, spaced apart at a perpendicular distance from each other. For each first guide path extending in a given guide surface, the associated second guide path is determined by the CAD system. The first guide paths, are in effect, analogous to the contour lines of a topographical map representing the shape of the work piece.

It should be noted that, according to known computing algorithms, the shape of the work piece and the guide paths need to be modeled only as accurately as required in accordance with given tolerances, so that the known techniques of approximating work piece surfaces and contour curves through trimmed surfaces, solid geometries, or approximation curves, can be used.

In a preferred embodiment of the present invention, the orthogonal distance of the second guide path from the guide surface containing the first guide path, is kept constant. For example, the guide surface containing the first guide path may be parallel to the xy-plane of a spatially fixed coordinate system, meaning that only x and y are variable along the first guide path, while the z-coordinate of the first guide path has a constant value. The surface containing the second guide path runs parallel at another fixed value of the z-coordinate.

In a preferred embodiment of the present invention, the second guide path is defined as the locus of all points that are obtained by transposing each point of the first guide path in a direction orthogonal to the first guide path, to a point located at a given distance parallel to the guide surface, and another given distance perpendicular to the guide surface. Consequently, if the second guide path was projected perpendicularly onto the guide surface of the first guide path, the first guide path and the projection of the second guide path would run within the essentially planar guide surface at a constant distance from each other. In the case where the first guide path forms a closed loop, the projection of the second guide path will run inside the first guide path, if the corresponding surface detail of the work piece is of concave shape. The projection of the second guide path will run outside the first guide path, if the corresponding surface detail of the work piece is of convex shape.

In another feature of the present invention, for each point where the axis of the tool intersects with the first guide path, the associated point where the tool axis is guided on the second guide path is determined as the point of minimal distance from the point of the first guide path. This assures the synchronous progress of the point traveling along the second guide path with the advancement of the point of the tool that is guided at a given speed along the first guide path. The parametric representation of the first guide path as a function of time, which determines the speed of motion of the point on the tool axis, provides a simple means of computing the synchronous parametric representation of the second guide path. As a result, the two points on the axis of the tool, and thus, the orientation of the tool axis, are unambiguously determined.

In this context, as a further advantage, the point of intersection of the axis with the first guide path moves along the latter at a uniform speed, and the second guide path is a suitable assembly of approximation curves so that the point of the axis moving along the second guide path advances smoothly (i.e., relatively free from jolts—which are defined as the first derivative of acceleration (i.e., the third derivative of the travel path with respect to time)). While the given speed assures a jolt-free movement along the first travel path, the resulting second travel path may have points where a time derivative is not defined; a condition which would cause undesirable jolts when the tool axis passes through the respective locations on the second travel path. Through an appropriate selection of the approximating curve segments (i.e., cube spline functions), the jolts can be minimized by assuring the continuity of the third derivative with respect to time.

Another important feature of the present invention is that for every tool position of the tool on the first guide path and the associated orientation of the tool axis, the positional relationship between the geometrical envelope of the tool and the topography of the work piece surface is calculated in advance. In the case that a spatial interference is found in a place other than the working portion of the tool, the present method includes the step of predicting a collision between the two spatial envelopes. A collision between the tool (i.e., the milling head consisting of the cutter and the tool holder), and the work piece surface in progress, can be avoided by being circumspect in the selection of the second guide path.

Another important feature of the present invention is automatically predicting and avoiding a collision. This takes into account not only the geometrical shape of the tool itself, such as an elongated cylindrical cutter, but also the shape of the tool holder, which in the case of deep cavities, has to enter so far inside the spatial perimeter of the work piece that it could collide with the walls of the cavity.

Based on this capability of predicting an impending collision, a preferred embodiment of the present invention provides an automatic collision avoidance by calculating the maximum angle (just short of the angle where a collision would occur) at which the axis of the tool can be inclined in relation to the perpendicular direction of the guide surface of the first guide path, and by setting the orientation of the axis according to the calculated maximum angle. With this reorientation of the axis, the tool can move on without any interruption of the work process.

As the reorientation of the axis can cause a change in the position of the working portion of the tool in relation to the material block being processed, a second embodiment of the present invention provides for a recalculation of the first guide path, taking the geometry of the working portion of the tool into account.

It is of significance that in this calculation, the geometry of the tool is substituted by an approximation surface that radially surrounds the tool. The approximation surface can be defined (i.e., by patching together surface segments as is customary in CAD systems), by a synthesis of solid geometries or by using lattice cell structures, which significantly simplifies and shortens the calculation of the spatial interference, because the collision-avoidance computation can be performed at a relatively coarse tolerance level. Given that the tools frequently are rotationally symmetrical in relation to their axes, and the tool holders in most cases have a larger diameter than the actual tool itself, conical approximation surfaces, in particular, would be a preferred choice (i.e., surfaces that extend from the working portion of the tool towards the tool holder with a widening conical taper to surround the tool holder).

There has thus been outlined, rather broadly, the more important features of the invention in order that the detailed description thereof that follows may be better understood, and in order that the present contribution to the art may be better appreciated. There are, of course, additional features of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein, as well as the abstract included below, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

BRIEF DESCRIPTION OF THE DRAWINGS

Additional features, details, and advantages of the invention, will become evident from the following description and the drawing, wherein FIGS. 1(a), (b) and (c) are schematic views of milling tools with differently shaped working portions.

DETAILED DESCRIPTION THE PREFERRED EMBODIMENTS

Figure 1:
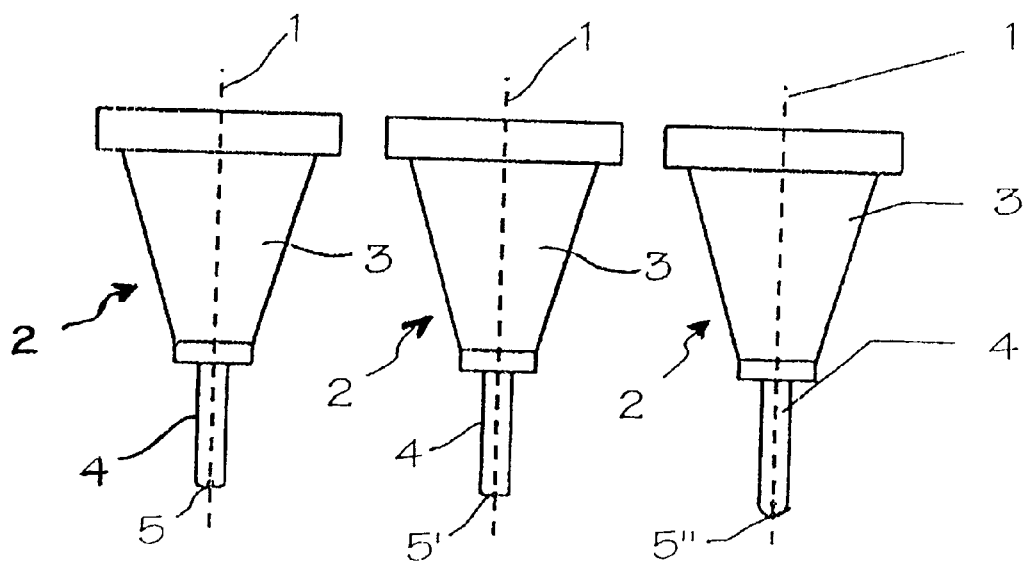
Figure 2:
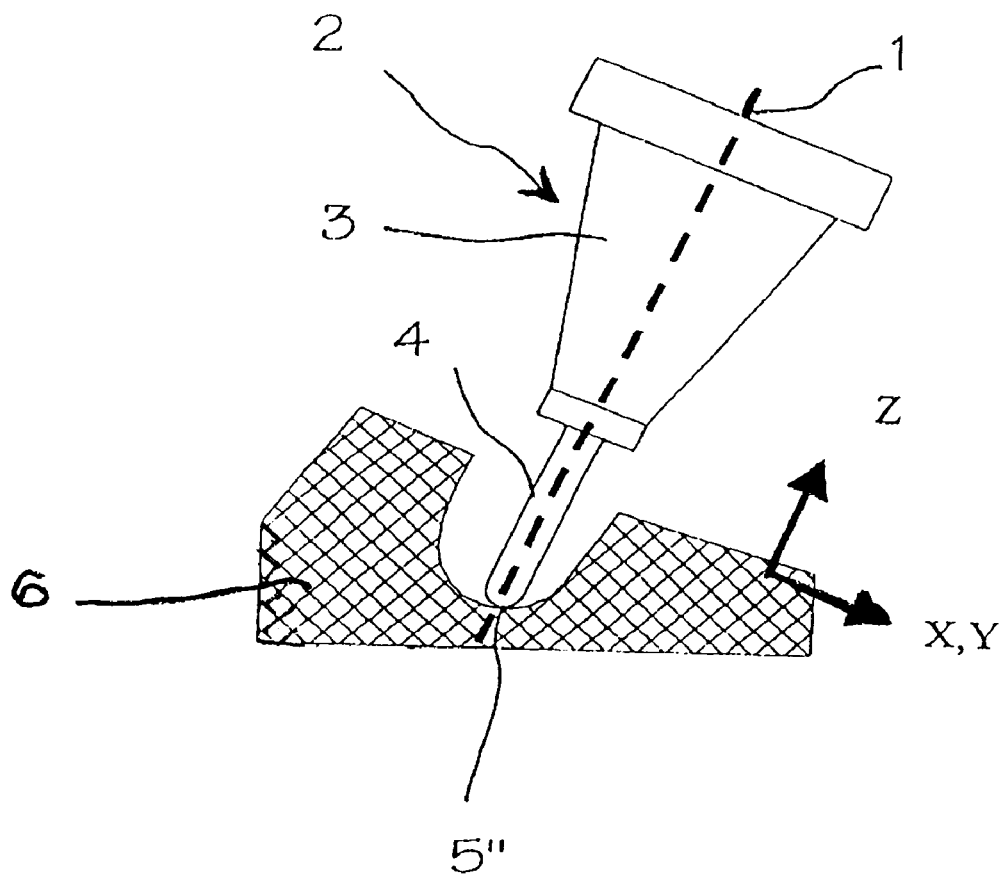
FIG. 2 is a schematic view of a milling tool in the process of shaping a cavity.

The present invention, as shown in FIGS. 1(a), 1(b), and 1(c), discloses a tool 2 which has a rotational symmetry with respect to an axis. The tool 2 includes an essentially conical tool holder 3, and clamped in the holder 3, a cylindrical tool shank 4 of a mill cutter of cylindrical shape, the shank 4 being significantly longer than it is wide. The axis 1 represents the axis of rotational symmetry of the conical tool holder 3, as well as that of the cylindrical tool shank 4. The only difference between the three tools 2 shown in FIGS. 1(a), 1(b), and 1(c), is the shape of the respective working portions 5, 5', 5" that are located at the free ends of the tools 2 (i.e., the opposite ends on the tool shank 4 form the tool holder 3). The purpose of the working portion 5, 5', 5" is to mechanically interact with and remove material from a material block 6 to form a work piece, as shown schematically in FIG. 2.

For example, the tool 2 in FIG. 1(b) is a shank-type mill cutter with a long cylindrical tool shank 4 whose working portion 5' is formed on a radially directed end surface at the free end. FIG. 1(a), on the other hand, shows a radius mill cutter in which the working portion 5 at the transition between the end surface and the outside circumference of the shaft 4 is rounded with a given radius. Finally, FIG. 1(c) shows a spherical mill cutter in which the working portion 5" at the free end of the tool shank 4 is rounded in the shape of a hemisphere.

The tool 2 is part of a five-axis milling machine with translatory movement of the tool 2 in a three-dimensional Cartesian coordinate system x, y, z, and swiveling movement about two mutually orthogonal rotational axes. The momentary swiveled orientation of the tool is described by a unit vector (i.e., a vector whose components u, v, w meet the condition $u^2+v^2+w=1$) which runs parallel to the direction of the axis 1.

The milling machine is equipped with a computer numerical control (CNC) system that can execute numerical control (NC) programs prepared on computer-aided manufacturing (CAM) systems, i.e., a system that has the capability to direct a desired working movement of the milling tool 2.

In order to machine a work piece of a prescribed shape from a material block 6, the shape is modeled in a CAD system and described through data sets represented in the customary CAD formats that give a sufficient definition of the surface of the work piece (i.e., material block 6) that is to be produced in the machining process. On the basis of this data, first guide paths 7 are calculated in planar guide surfaces 8.

As an example, the conventional CAD format types known as NURBS (Non-Uniform Rational B-Splines), B-Spline functions, Bezier curves, as well as proprietary solid-modeling formats such as B-Rep and Mockups, can be used. The guide paths computed from the CAD data are delivered in data formats that are compatible with conventional CNC's.

Figure 3:
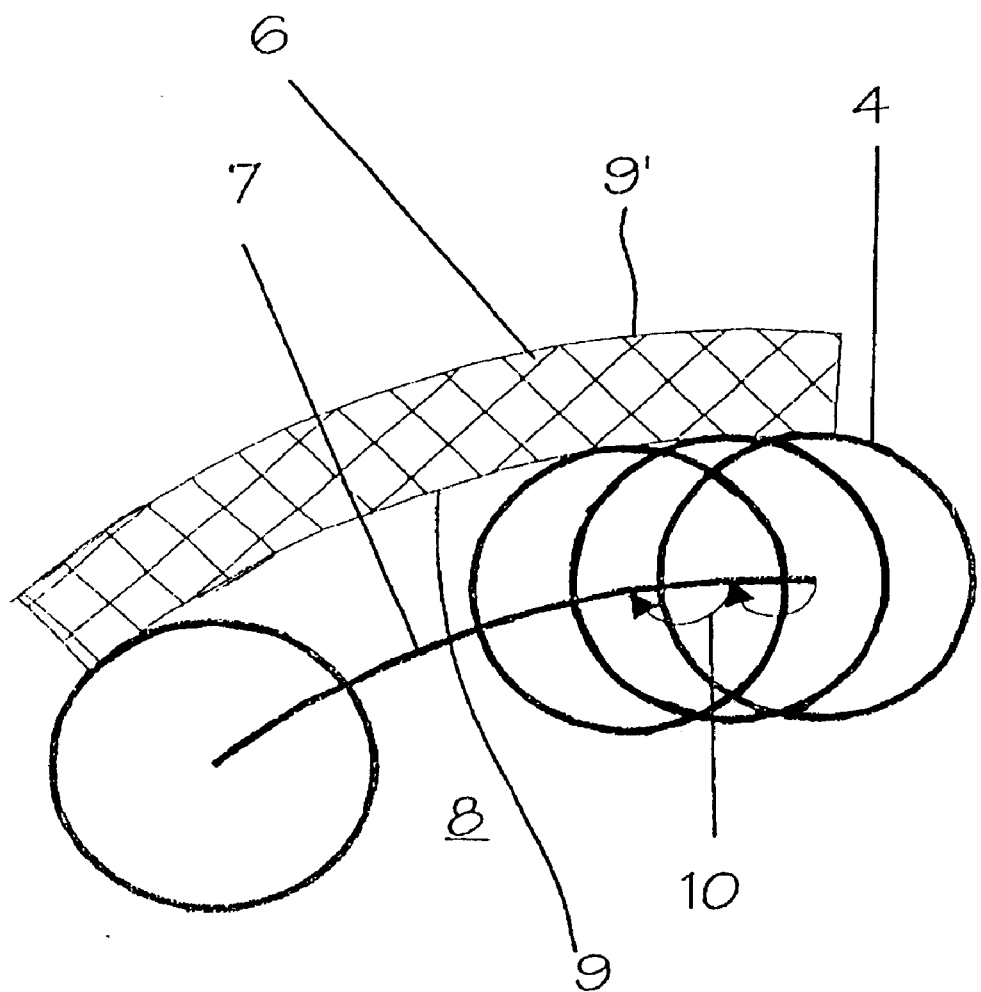
FIG. 3 shows part of a plane view of a guide surface with a first guide path of the milling tool.

FIG. 3 shows a segment of a first guide path 7 in a viewing direction perpendicular to the planar guide surface 8 that contains the first guide path 7. FIG. 3 also shows the tool shank 4 in cross-section, as well as the surface portions 9, 9' of the material block 6 that have already been shaped by the machining process. In actual fact, FIG. 3 shows only a smoothed-over course of the first guide path 7. At a detailed level, the respective working portion 5, 5', 5" of the tool shank 4 runs off and returns to the smooth course of the first guide path 7 in small, curved path segments 10.

Figure 4:
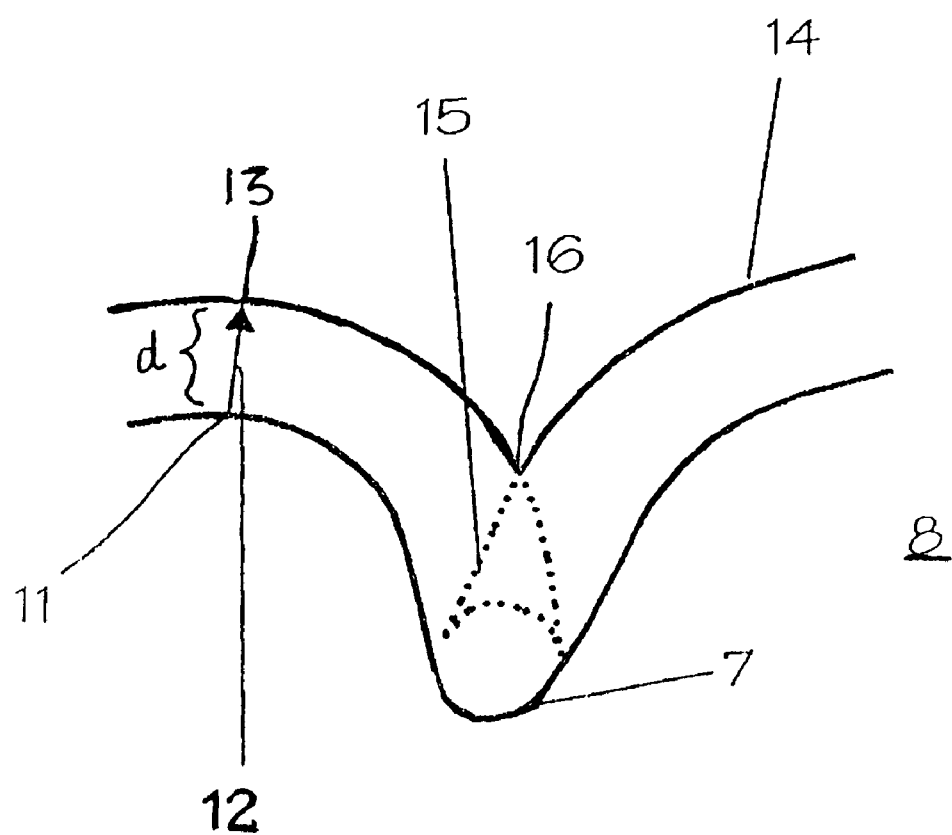
FIG. 4 is a schematic view which shows how the second guide path is determined.

FIG. 4 shows a segment of a first guide path 7 in a viewing direction perpendicular to a guide surface 8. For every point 11 on the first guide path 7, a distance vector 12 is determined, which is orthogonal to the tangent of the first guide path 7 at the point 11, and of a prescribed fixed length d. The points 13 at the opposite ends from the points 11 of the distance vectors 12, thus define the locus 14 of all the points that lie at the prescribed distance d from the first guide path 7. In sections of narrow curvature of the first guide path 7, the process of a point-by-point calculation of the distance vector 12 can produce results like the segments 15 represented by the dotted lines in FIG. 4. However, the segments 15 which do not meet the condition of a prescribed distance d with respect to all of the first guide path 7, are therefore, deleted, starting from their point of intersection 16, so that the true locus 14 is obtained as the remaining continuous curve shown as a solid line in FIG. 4.

Figure 5:
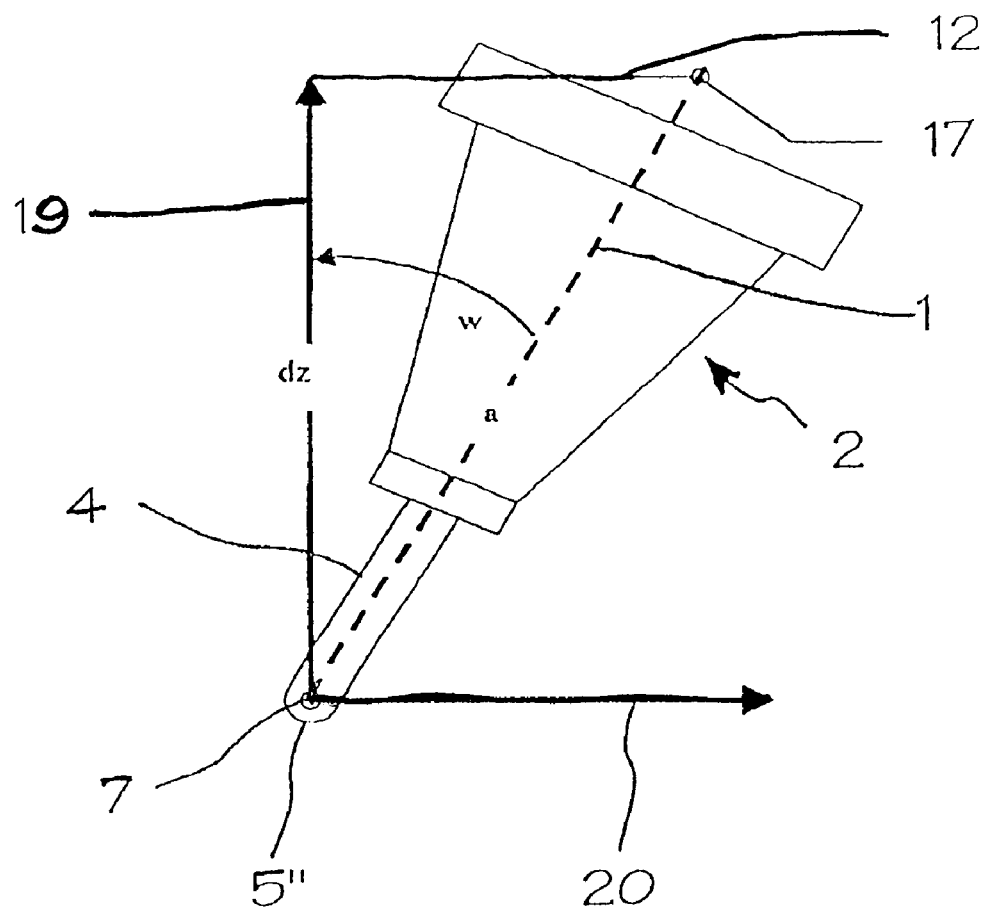
FIG. 5 is a schematic view of the position of the milling tool in relation to the two guide paths.

In accordance with FIG. 5, each point on the locus curve 14 extending in the planar guide surface 8 of the first guide path 7 is translated by a prescribed orthogonal distance dz parallel to the guide surface 8, and another prescribed distance perpendicular to the guide surface 8, and the translated curve is used as a second guide path 17 for a point of the axis 1 of the tool 2. Thus, the orthogonal distance of the second guide path 17 from the guide surface 8 containing the first guide path 7, is kept constant. As an example, the guide surface 8 containing the first guide path 7 may be parallel to the xy-plane of a spatially fixed coordinate system, meaning that only x and y are variable along the first guide path 7, while the z-coordinate of the first guide path 7 has a constant value. The surface containing the second guide path 17 runs parallel at another fixed value of the z-coordinate.

In other words, if the second guide path 17 were projected perpendicularly onto the guide surface 8 of the first guide path 7, the first guide path 7 and the projection of the second guide path 17 would run within the essentially planar guide surface 8 at a constant distance from each other. In the case where the first guide path 7 forms a closed loop, the projection of the second guide path 17 would run inside the first guide path 7, if the corresponding surface detail of the work piece is of concave shape. The projection of the second guide path 17 would run outside the first guide path 7, if the corresponding surface detail of the work piece is of convex shape.

As FIG. 5 further illustrates, the axis 1 intersects the first guide path 7 at the center of the working portion 5" of the ball-shaped cutting end of the tool shank 4. Thus, the two points of intersection with the first and second guide paths 7 and 17, respectively, define the orientation of the axis 1 at an acute angle w in relation to the normal vector 19 of the plane guide surface 8, with vector 20 being representative of the guide surface 8 itself. Thus, the unit vector (u, v, w) describing the spatial orientation of axis 1 is completely defined.

In other words, while the first guide path 7 is selected so that the material-removing working portion 5 of the tool 2 (i.e., the cutting tip of a mill cutter), in moving along the first guide path 7, corresponds to a contour curve of the desired work piece shape in the guide surface 8, the second guide path 17 is suitably selected so that the orientation of the rotary axis 1 of the tool 2 (i.e., the mill cutter), is at any time in the process, optimally adapted to the surface wall 9 of the material block 6 as it is being shaped, and/or the tool 2 and its tool holder 3 are held at a predetermined distance from the surface of the material block 6.

Since the shapes of the work pieces are modeled with CAD systems, and the guide paths computed from the CAD data delivered in data formats compatible with conventional CNC's, the CNC's will then guide the numerically-controlled machine tool 2 such that the aforementioned two points on the tool axis 1 follow the first and second guide paths 7, 17, respectively.

According to known computing algorithms, the shape of the material block 6 and the guide paths 7, 17 need to be modeled only as accurately as required in accordance with given tolerances, so that the known techniques of approximating work piece surfaces and contour curves through trimmed surfaces, solid geometries, or approximation curves can be suggested.

Figure 6:
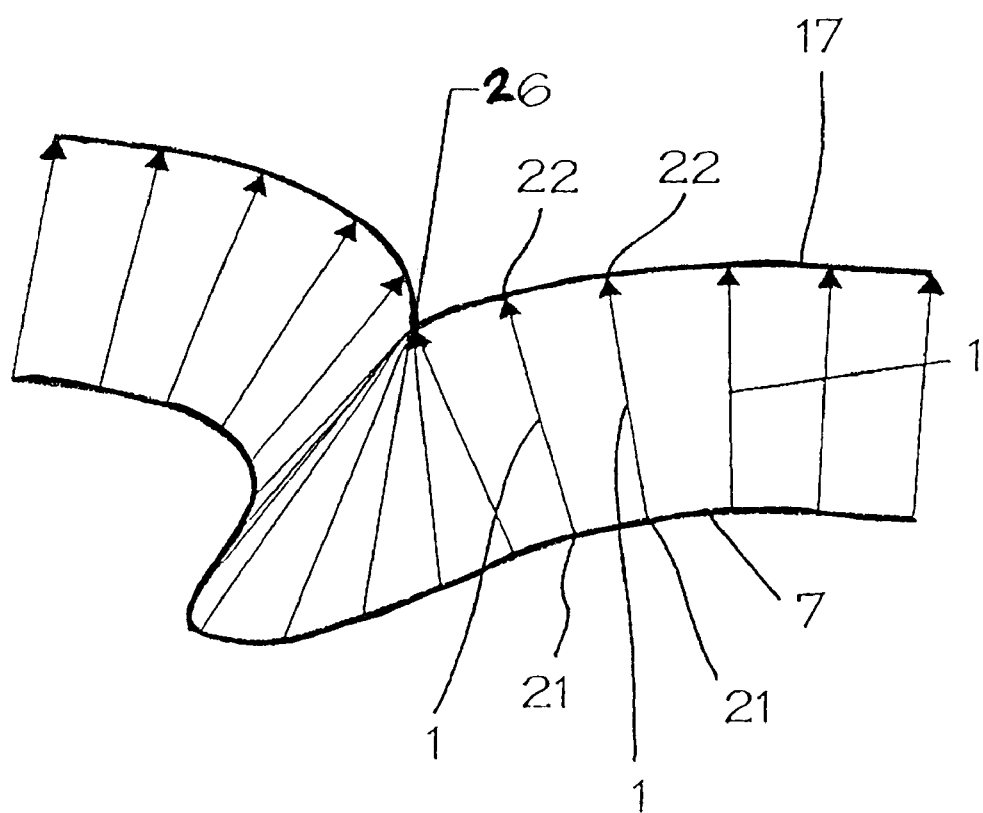
FIG. 6 is a schematic view showing the concept of synchronous tool advancement along the first and second guide paths.

A constant speed is prescribed for the advancement of the surface-shaping work portion 5, 5', 5" of the tool 2 along the first guide path 7, so that the points of intersection 21 (see FIG. 6) of the axis 1 with the first guide path 7, will move along the latter at a uniform rate of advancement. The movement along the first guide path 7 is obtained by defining the (x, y, z) coordinates of the first guide path 7 in parametric form as a function of the time t and determining the time derivative.

To establish the orientation vector (u, v, w) of the axis 1 of the tool 2 for each point 21 where the axis 1 intersects the first guide path 7, the associated point 22 on the second guide path 17 is determined so that the distance between points 21 and 22 is minimized. This assures the synchronous progress of the point 22 traveling along the second guide path 17 with the advancement of the point of the tool 2 that is guided at a given speed along the first guide path 7. This rule defines for every parameter value t not only the three coordinates x(t), y(t), z(t) of the point of intersection 21 moving along the first guide path 7, but also the coordinates a(t), b(t), c(t) of the point of intersection 22 moving along the second guide path 17. The unit vector u(t), v(t), w(t) representing the spatial orientation of the axis 1 of the tool 2 is defined by the aforementioned six coordinates, so that the five machine-coordinate functions for guiding the tool 2 are completely determined. Thus, the parametric representation of the first guide path 7 as a function of time, which determines the speed of motion of the point on the tool axis 1, provides a simple means of computing the synchronous parametric representation of the second guide path 17. As a result, the two points on the axis 1 of the tool 2, and thus, the orientation of the tool axis 1, are unambiguously determined.

Figure 7:
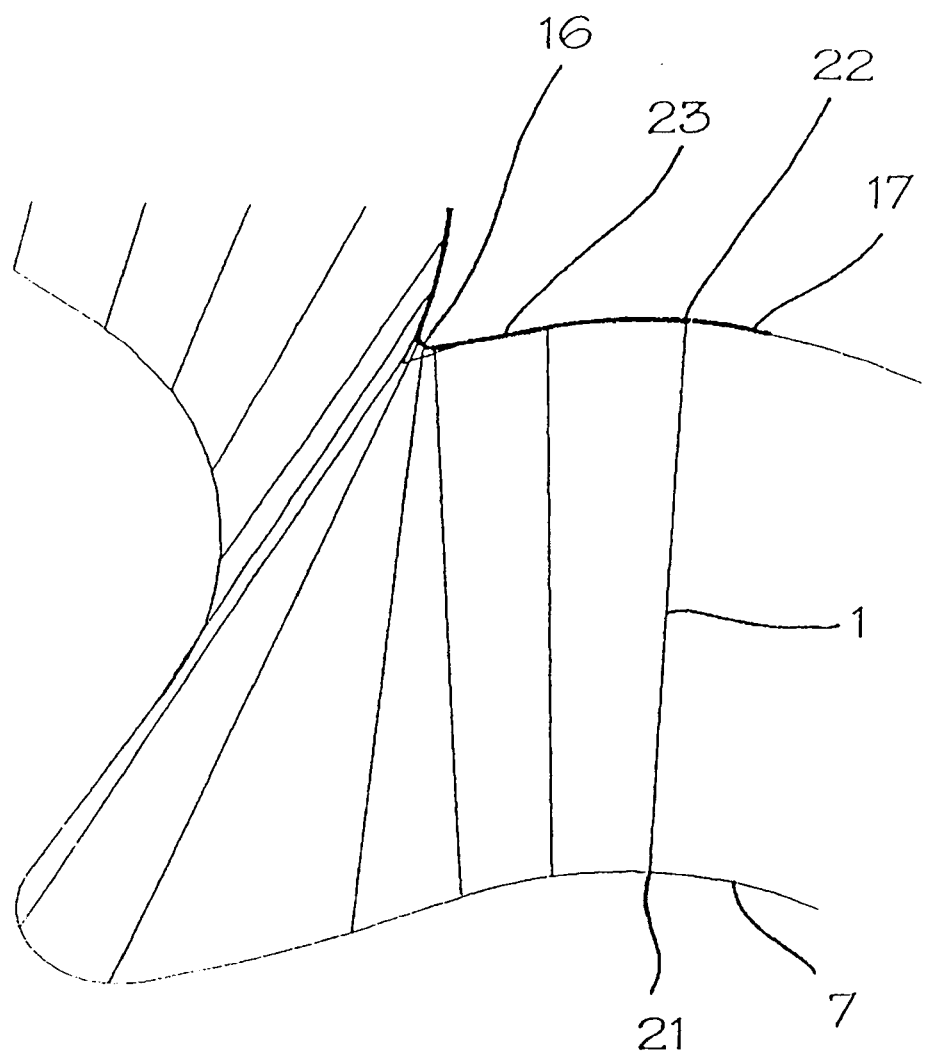
FIG. 7 is a schematic view of a jolt-reducing approximation of the second guide path.

As has already been discussed in the context of FIG. 4, the locus 14 on which the second guide path 17 is based, can have sharp corners 26 (i.e., singularities) where the time derivative is not defined, in places where the first guide path 7 runs through turns of narrow curvature. Starting from the parametric representation of the second guide path 17 as a function of time, the first derivative provides the rate of advancement along the second guide path 17, the second derivative provides the acceleration, and the third derivative indicates changes in acceleration. In order to avoid undesirable jolts caused by abrupt changes of acceleration (peak values of the third derivative with respect to time), the point of intersection 21 of the axis 1 with the first guide path 7 moves along the first guide path 7 at a uniform speed, and the second guide path 17, at least in the vicinity of the singularities 16, is substituted by an approximation curve 23 (see FIG. 7) that has continuous derivatives, such that the point 22 of the axis 1 moving along the second guide path 17 advances smoothly, and thus reduces the jolting effects. A-jolt is defined as the first derivative of the acceleration (i.e., the third derivative of the travel path). Cubic spline functions are particularly well suited as approximation curves 23.

While the given speed assures a jolt-free movement along the first guide path 7, the resulting second guide path 17 may have points where a time derivative is not defined, a condition that would cause undesirable jolts when the tool axis 1 passes through the respective locations—on the second guide path 17. Through an appropriate selection of the approximating curve segments 10 (i.e., cubic spline functions), the jolts can be minimized by assuring the continuity of the third derivative (with respect to time).

As in FIG. 5, the normal vector 19 of the guide surface 8 extends in the plane of the drawing. From FIGS. 5 and 8, and by also looking at FIG. 4, the first observation is that in places of narrow curvature of the first guide path 7, there is a heightened risk of a collision of the tool 2 with surface portions of the material block 6. With a suitable choice of the second guide path 17, or more specifically, of the distance vector 12 in FIG. 5, the slope angle of the axis 1 of the tool 2 is controlled in a manner that minimizes the danger of a collision. In addition, the movement of the tool 2 along the two guide paths 7, 17 presents itself to the machine operator as exceptionally harmonious and thus, provides the advantages of safety and predictability.

Figure 8:
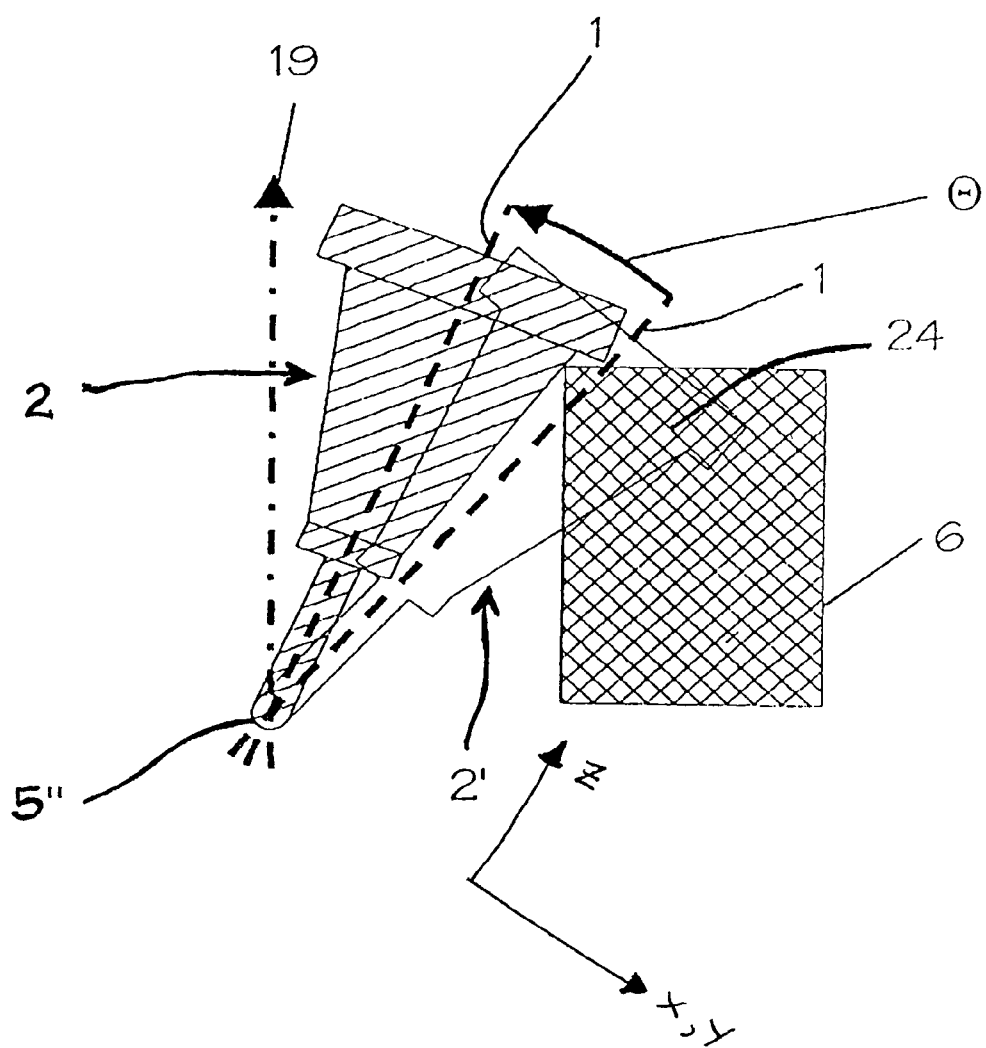
FIG. 8 is a schematic view of a reorientation of the tool axis to avoid a collision.

However, in complex-shaped work pieces, particularly with deep cavities, the use of a predetermined, fixed distance vector 12 cannot give complete assurance against collisions. For this reason, the present invention provides the capability of predicting an impending collision by analyzing for each position of the tool 2, the spatial relationship between the respective geometric envelopes of the tool 2 and the work piece in progress, and making an advance calculation whether they will interfere with each other as illustrated in FIG. 8, by the example of an interference 24 between the tool envelope 2' and the work piece envelope of the material block 6. By this process of computation, a collision is predicted if the tool 2 follows the pre-calculated guide paths 7, 17.

Thus, for every position of the tool 1 on the first guide path 7 and the associated orientation of the tool axis 1, the positional relationship between the geometrical envelope of the tool 1 and the topography of the work piece surface is calculated in advance. In the case that a spatial interference is found in a place other than the working portion of the tool 2, the present method can include the step of predicting a collision between the two spatial envelopes.

A collision between the tool 2 (i.e., the milling head consisting of the cutter and the tool holder 3) and the work piece surface in progress, can be avoided by being circumspect in the selection of the second guide path 17. Thus, the method of the present invention takes into account not only the geometric shape of the tool 2 itself, such as an elongated cylindrical cutter, but also the shape of the tool holder 3, which in the case of deep cavities, has to enter so far inside the spatial perimeter of the work piece that it could collide with the walls of the cavity.

In response to a prediction of a collision, the method of the present invention calls for an automatic collision avoidance, with a calculation of the maximum angle (just short of the angle where a collision would occur) at which the axis 1 of the tool 2 can be inclined in relation to the normal vector 19 of the guide surface 8 of the first guide path 7, and the setting of the orientation of the axis 1 according to the calculated maximum angle. After a maximum angle of the foregoing definition has been found, the pre-calculated position (x, y, z, u, v, w) is replaced by the new, collision-free position represented by coordinates x, y, z, u', v', w'. This means that the axis 1 is rotated by an angle θ towards the normal vector 19, so that the interfering portion 24 of the tool 2 is moved out of the envelope of the work piece and the tool 2 can move on without any interruption of the work process.

However, in a case where a collision-free orientation of the axis 1 cannot be found (i.e., because of an unfavorable shape of the second guide path 17), the process of generating the control program is terminated. Prior to terminating the program, an attempt can be made to calculate whether a collision at the predicted locations could be avoided by lateral excursions from the plane defined by the axis 1 and the normal vector 19.

Figure 9:
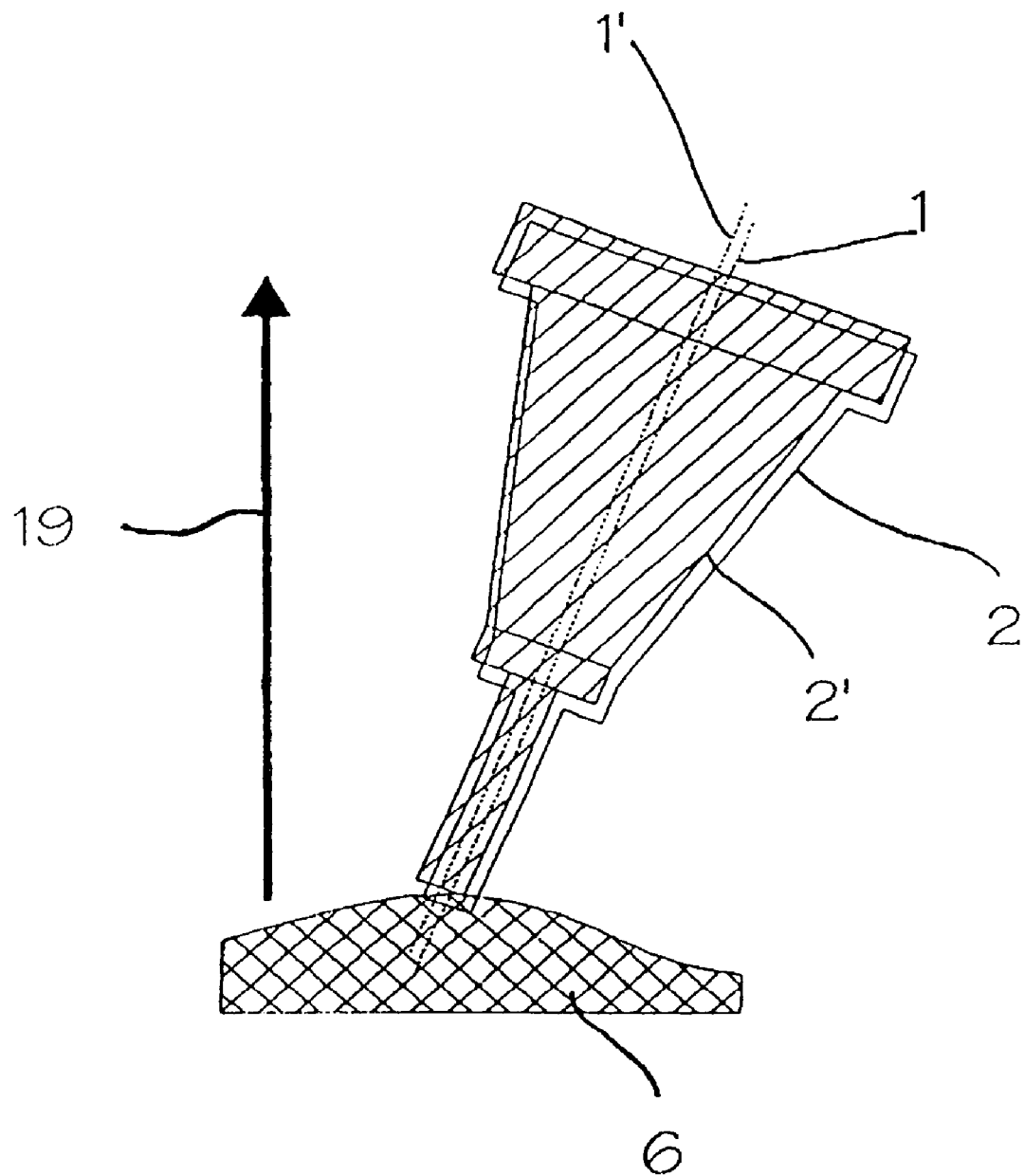
FIG. 9 is a schematic view of how the first guide path is recalculated after a reorientation of the axis.

Because of the spherical shape of the mill cutter of FIG. 1(c), if the orientation of the axis 1 is changed in order to avoid a collision, there is no change required in the contact zone between the surface-shaping working portion 5" and the material block 6. In contrast, with the radius cutter shown in FIG. 1(a) as well as the shank-type cutter of FIG. 1(b), a recalculation of the contact zone will be required because the material-removing work portions 5, 5' are not of a spherically symmetrical shape. FIG. 9 helps visualize this situation. As a result of the recalculation, the tool 2 with axis 1 is moved in the direction of the normal vector 19 to the position indicated by the reference symbols 2' and 1', respectively. The contact zone is thereby adjusted without creating a renewed risk of collision; at least as long as the shape of the work piece to be produced does not contain any undercuts. If there is a renewed risk of a collision because of complicated undercuts in the shape of the work piece, the collision analysis that was discussed above in the context of FIG. 8 can be performed again, following the adjustment of the contact zone that has just been explained on the basis of FIG. 9. The process of adjustments and collision analysis can be repeated as an iterative cycle until there is complete assurance that there is no longer a risk of collision.

As the reorientation of the axis 1 can cause a change in the position of the working portion 5 of the tool 2 in relation to the material block 6 being processed, a second embodiment of the present invention provides for a recalculation of the first guide path 7, taking the geometry of the working portion 5 of the tool 2 into account.

In particular, in order to simplify and speed up the collision analysis discussed in the previous paragraphs, it is practical to replace the possibly complicated spatial envelope of the tool 2 and reduce the complexity of the associated computations by using a simplified approximation surface 25 that radially surrounds the tool 2 in a way where the freedom from collisions between the actual tool 2 and the work piece in progress can be concluded with certainty from an absence of collisions between the approximated surface 25 and the work piece.

The approximated surface can be defined (i.e., by patching together segments as is customary in CAD systems), by a synthesis of solid geometries or by using lattice cell structures, which significantly simplifies and shortens the calculation of the spatial interference because the collision-avoidance computation can be performed at a relatively coarse tolerance level.

More specifically, if the shape of the work piece is represented in the collision analysis as a composite of contiguous planar facets, which is a sufficiently good approximation for this purpose, the calculation of interferences with each of the approximated surfaces 25, 25', 25" leads to cone sections. Given that the tools 2 frequently are rotationally symmetrical in relation to their axes 1, and the tool holders 3 in most cases have a larger diameter than the actual tool 2 itself, conical approximation surfaces in particular, would be a preferred choice (i.e., surfaces that extend from the working portion 5 of the tool 2 towards the tool holder 3 with a widening conical taper to surround the tool holder 3).

Figure 10:
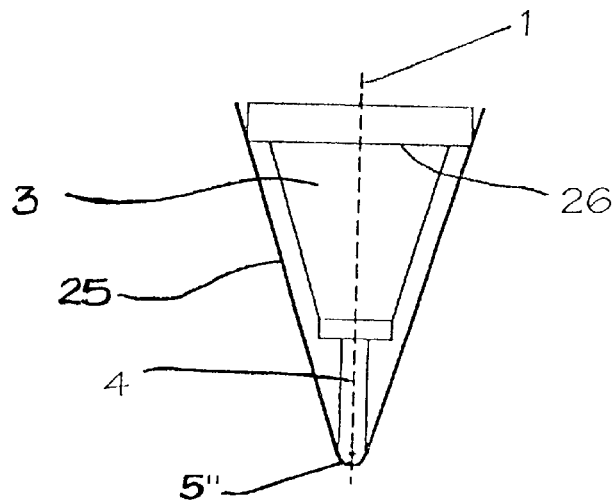
FIGS. 10(a), (b) and (c) are schematic views of different approximation surfaces for the geometric envelope of the tool.
Figure 10:
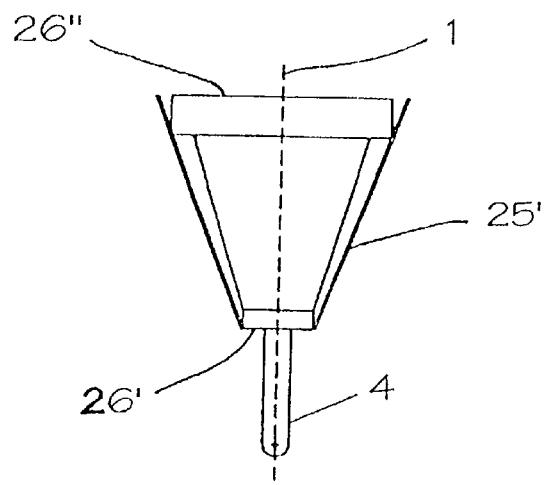
Figure 10:
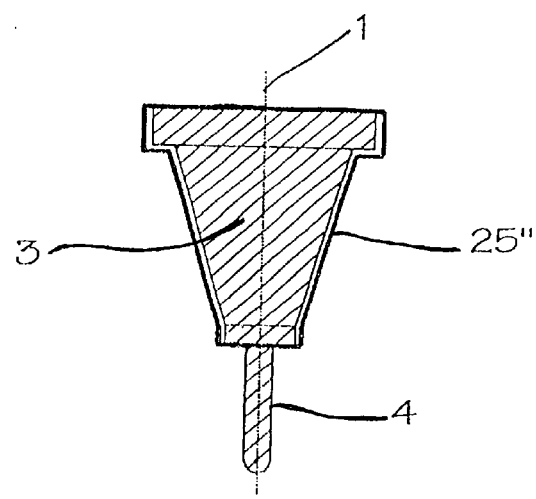

Examples of the approximated surfaces are illustrated in FIGS. 10(a), (b), and (c). The approximated surface 25 of FIG. 10(a) is a relatively coarse substitute for the tool 2 in the shape of a cone conforming at its apex to the working portion 5" of the tool shank 4 and diverging from there to the maximum radius 26 of the tool holder 3.

The approximated surface 25' of FIG. 10(b) represents the tool 2 somewhat more closely in a frusto-conical shape conforming to the minimum radius 16' and the maximum radius 26" of the tool holder 3, while the tool shank 4 is represented in the collision analysis by its exact actual shape.

The approximated surface 25" shown in FIG. 10(c) gives an even closer representation of the actual shape of the tool 2 as it envelops the tool holder 3 in complete conformance to the actual shape at a slight radial distance.

Accordingly, only quadratic equations are involved, which can be solved algebraically. As an alternative to planar facets, it is also possible to use a point lattice, which can be analyzed very rapidly by known methods. As a further option, the geometric models of the tool 2 can be described by surfaces or solids, providing a simply way of carrying out the calculation The many features and advantages of the invention are apparent from the detailed specification, and thus, it is intended by the appended claims to cover all such features and advantages of the invention which fall within the true spirits and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. A method of guiding a tool having a working portion, to machine a work piece of a prescribed shape from a material block, comprising the steps of:

moving the working portion of the tool along a first guide path extending along an essentially planar guide surface of said block;

intersecting said first guide path at a first point on an axis of the tool during said moving step, such that said axis is at an orientation with respect to said guide surface; and moving a second point on said axis of said tool, which is located at a predetermined distance from said first guide path, along a prescribed second guide path;

and wherein said first point is moved along said first guide path at a uniform speed, and wherein said second guide path is represented by an assembly of approximation curves that approximate a portion of the prescribed shape such that the third derivative of said second guide path with respect to time is defined.

2. The method of claim 1, wherein said second guide path is at a constant orthogonal distance (dz) from the planar guide surface.

3. The method according to claim 1, wherein said first guide path includes a plurality of points, and said second guide path includes a locus of all points that are obtained by transposing each point of said first guide path in a direction orthogonal to the first guide path to a point located at a given distance from said first guide path with a first component (d) which is parallel to said guide surface and a second component (dz) which is perpendicular to said guide surface.

4. The method according to claim 1, wherein as a function of time at each first point where the axis of said tool intersects said first guide path, computing as a function of time the second guide path, where the respective second point of said tool axis simultaneously intersects said second guide path, that minimizes a distance between said first point and said second point.

5. The method according to claim 1, wherein said assembly of approximation curves includes a cubic spline function.

6. The method according to claim 1, wherein said guide paths are computed using a CAD system.

7. The method according to claim 1, wherein said first point and said second point define said orientation of said axis at an acute angle (w) in relation to a vector normal to said planar guide surface.

8. A method of guiding a tool having a working portion, to machine a work piece of a prescribed shape from a material block, comprising the steps of moving the working portion of the tool along a first guide path extending along an essentially planar guide surface of said block;

intersecting said first guide path at a first point on an axis of the tool during said moving step, such that said axis is at an orientation with respect to said guide surface;

moving a second point on said axis of said tool, which is located at a predetermined distance from said first guide path, along a prescribed second guide path;

wherein said first point is moved along said first guide path at a uniform speed, and wherein said second guide path is represented by an assembly of approximation curves that approximate a portion of the prescribed shape such that the third derivative of said second guide path with respect to time is defined; and calculating in advance for each position of said first point on the first guide path and the associated orientation of said axis of said tool, to determine when a geometrical envelope of said tool will have an interference with a surface topography of said work piece, and when an interference is found in a place other than the working portion of said tool, predicting a collision between said tool and said work piece.

9. The method according to claim 8, wherein said geometrical envelope of said tool is an approximation surface that radially surrounds the tool as a substitute for the actual geometric envelope of the tool.

10. The method according to claim 9, wherein said approximation surface is selected from one of a cone-shaped and a frusto-conical-shaped tool.

11. The method according to claim 8, wherein when a collision has been predicted, said collision is avoided by the steps of:

calculating a maximum angle at which said axis of said tool can be inclined in relation to a vector normal to the guide surface, to avoid a collision of said tool and said work piece, and setting the orientation of the tool axis according to the calculated maximum angle.

12. The method according to claim 11, further comprising the step of adjusting a contact zone between a surface shaping portion of said tool and said block, said step of adjusting chosen from the group consisting of calculating a new first guide path and moving said tool axis in the direction of the vector normal to the guide surface.

13. The method according to claim 8, further comprising the step of determining a slope angle of said axis of said tool using a CAD system to minimize any collision.

14. The method according to claim 8, wherein when a collision has been predicted and when calculating a maximum angle results in a collision and when a lateral excursion of said tool from the plane defined by said axis and the vector normal to the guide plane results in a collision, said collision is avoided by the step of terminating a control program that directs movement of the working portion of the tool along said first guide path.

* * * * *